United States Patent [19]

Kumagai

[11] Patent Number: 5,500,510

[45] Date of Patent: Mar. 19, 1996

[54] METHOD OF AUTOMATICALLY CONTROLLING THE FUSION PROCESS BETWEEN THERMOPLASTIC ARTICLES

[75] Inventor: Masaru Kumagai, Yao, Japan

[73] Assignees: Toua Kokyu Tugitevarubu Seizo Co.; Tokushu Kougyo Co., both of Japan

[21] Appl. No.: 332,789

[22] Filed: Nov. 2, 1994

[51] Int. Cl.$^6$ .................................................. H05B 1/02
[52] U.S. Cl. ........................ 219/505; 219/497; 219/482; 219/535; 156/274.2
[58] Field of Search ................................ 219/497, 492, 219/505, 506, 494, 501, 482, 535; 156/273.9, 274.2, 272.2

[56] References Cited

U.S. PATENT DOCUMENTS

| | | | |
|---|---|---|---|
| 4,684,789 | 8/1987 | Eggleston | 219/497 |
| 5,130,518 | 7/1992 | Merle | 219/535 |

*Primary Examiner*—Mark H. Paschall
*Attorney, Agent, or Firm*—Harold Gell

[57] ABSTRACT

A method of automatically controlling the fusion process of thermoplastic resin articles is done in a stepwise fashion. In response to a start signal, a current is applied to an electrical resistance heating element for fusing together facing resin surfaces. Electrical characteristics of the resistance heating element are calculated upon increase of the power to a given level and the specific heat of the resin is calculated through ON-OFF control of the resistance heating element. The power is then raised through stages based on the electrical characteristics of the resistance heating element and the specific heat to determine variation coefficients of the characteristics and specific heat at each stage and through further ON-OFF control. Finally, the power increase is stopped as the variation coefficient of specific heat reaches or becomes smaller than a given value. With the power established at a constant level, the ON-OFF cycles are continued until the specific heat becomes equal to or lower than a preset value. At that point the power is terminated, establishing an optimal operating condition for accurately fusing together any type of thermoplastic resin and any articles made therefrom.

5 Claims, 6 Drawing Sheets

METHOD OF AUTOMATICALLY CONTROLLING THE FUSION PROCESS BETWEEN THERMOPLASTIC ARTICLES

FIELD OF THE INVENTION

The present invention relates to a method of automatically controlling a fusion bonding process joining thermoplastic resin articles.

The so-called electro-fusion joints (hereinafter referred to as "EF joints") are and have been used to fixedly join thermoplastic resin articles together. Examples of those articles include water pipes, drain pipes and gas pipes. Each of the EF joints comprise a body and an electric resistance heating wire embedded therein, with the boding occurring between the EF joint and articles made of an appropriate thermoplastic. An electric current is supplied to the electric resistance heating wire to heat and fuse the thermoplastic EF joint and the pipes so that they become integral with each other.

PRIOR ART

Electro-fusion controllers (hereinafter referred to as "EF controllers") of the prior art have control patterns adapted to energize the electric resistance heating wire. The patterns correspond to different types of EF joints are stored in memory devices in the EF controllers. The most appropriate pattern is selected for the EF joint in use in order to automatically control the electric power for the fusion process.

However, electrical characteristics of the EF joints from various manufactures differ from one another in the resistance of their heating wires (viz. resistors) and temperature coefficients thereof. One EF controller matches only one type of EF joint, so that piping workers must have a large assortment of EF controllers which causes an economical loss.

SUMMARY OF THE INVENTION

An object of the present invention is therefore to provide a method of automatically controlling the fusion process for all types of EF joints and for a variety of thermoplastic pipes in each type of EF joint.

The method provided herein comprises the steps of:

(1) supplying an electric resistance heater with an electric current in response to a start signal indicating the start of the fusion process, the electric resistance heater serving as a heat source to fuse together thermoplastic resin surface layers facing one another and in close contact with each other, calculating the electrical characteristics of the electric resistance heater upon increase of the electric power to a predetermined level, and also calculating specific heat of the resin by conducting ON-OFF control cycles of the electric resistance heater;

(2) subsequently raising the electric power stepwise in successive stages based on the values of electrical characteristics and specific heat which were measured at the first step (1) so as to detect a variation coefficient of electrical characteristics at each stage, and also detecting a variation coefficient of specific heat at each stage by further conducting ON-OFF cycles of the heater; and (3) finally discontinuing the increase of electric power when the variation coefficient of specific heat measured at the second step (2) reaches or becomes smaller than a prescribed value, with the ON-OFF cycles being continued until the specific heat itself becomes equal to or lower than a prescribed level whereupon the supply of electric power to the electric resistance heater is turned off.

The third step (3) may be modified such that the supply of electric power is stopped after a length of time has passed after the start of ON-OFF cycles at step (3), wherein the length of time is calculated using the value of specific heat measured at the second step (2).

According to the present invention, an optimal level will be determined for energizing the electric resistance heater and partially melting the resin articles, based on the heater's electrical characteristics and the resin's physical properties which are being measured at the same time during the fusion process. Thus, articles made of any resin can be fused together successfully and accurately.

BRIEF DESCRIPTION OF THE DRAWINGS

In the drawings showing some embodiments of the invention.

THE PREFERRED EMBODIMENTS

Figure 1:
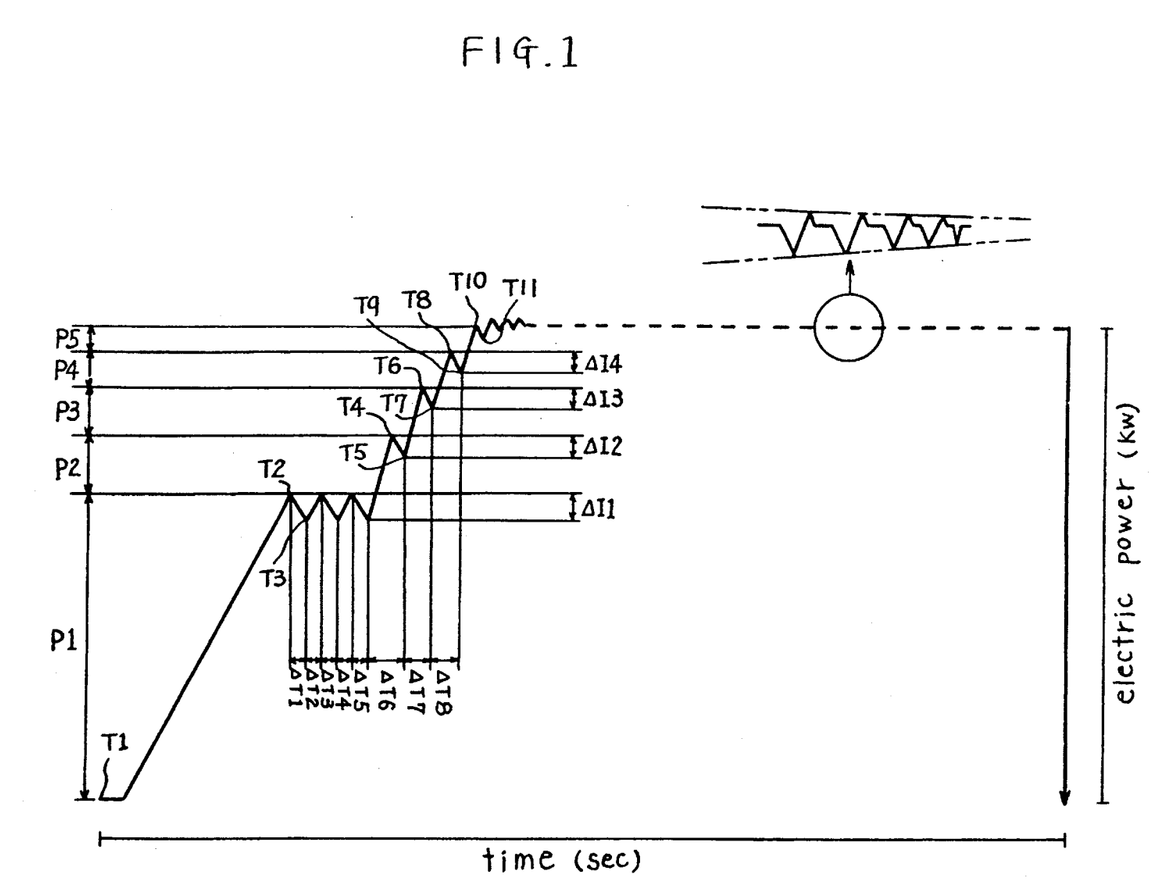
FIG. 1 is a control diagram of an embodiment for automatically controlling the fusion process in which thermoplastic articles are fused together.
Figure 2:
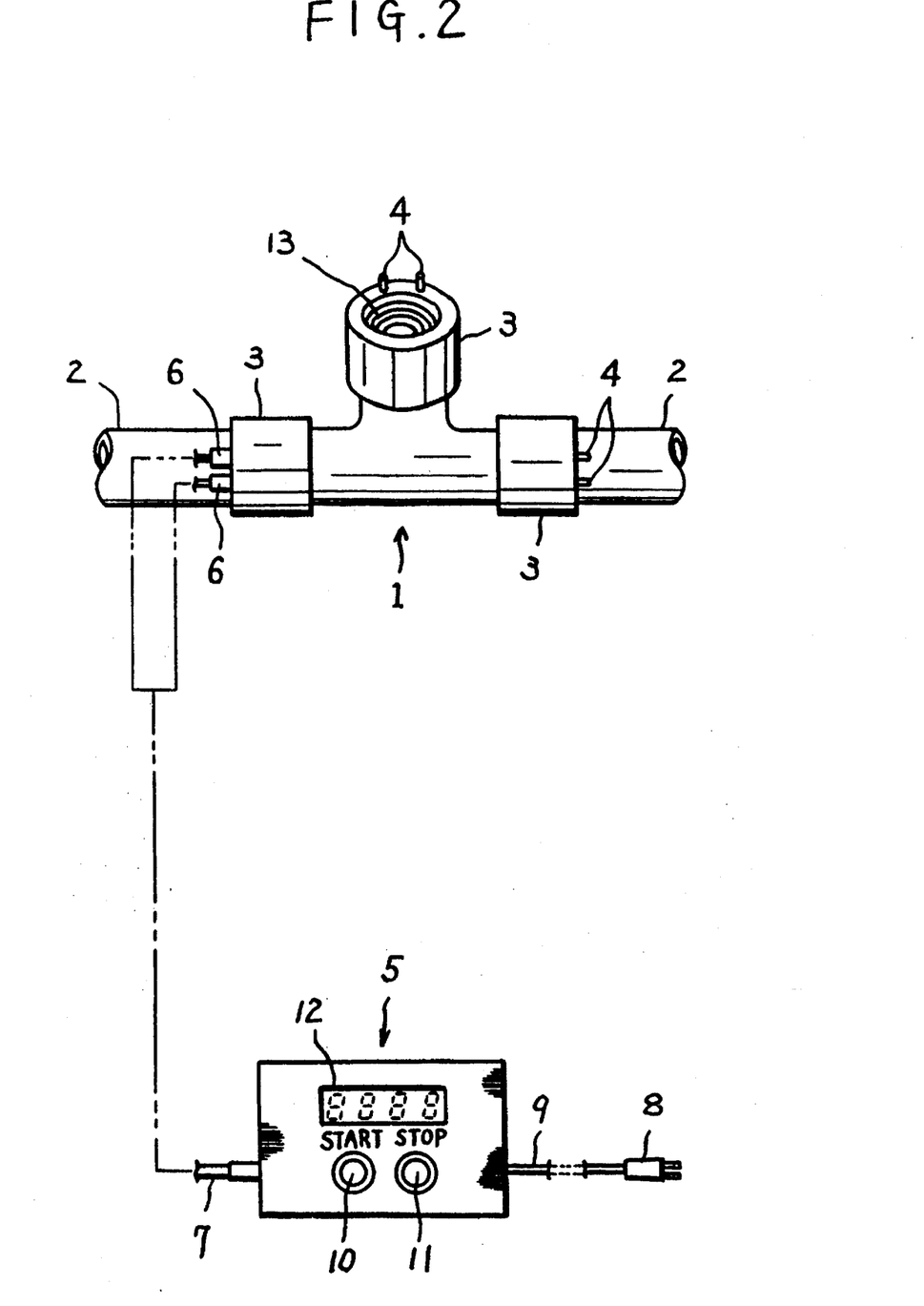
FIG. 2 is a perspective front elevation of an EF joint and an EF controller used in the embodiment.

The EF joint and EF controller shown in FIG. 2 are used as examples in the method of automatically controlling the fusion process of thermoplastic articles. The process is controlled according to the control diagram shown in FIG. 1. The T-shaped EF joint 1 has socket portions 3 which receive the ends of thermoplastic resin pipes 2 to be joined. A pair of terminal pins 4 protrude outwardly from end surfaces of each socket portion. The EF controller generally denoted by the reference numeral 5, includes a CPU (viz. central processing unit) used for the automatic control of the fusion process. A control cable 7 extends from the controller. It has, at its extremity, connectors 6 which mate with the terminal pins 4. A power cable 9 extends from the controller and has at its free end a plug 8 to be inserted in a power supply socket. The controller 5 further comprises a start switch 10, a stop switch 11 and an indicator 12.

Figure 3:
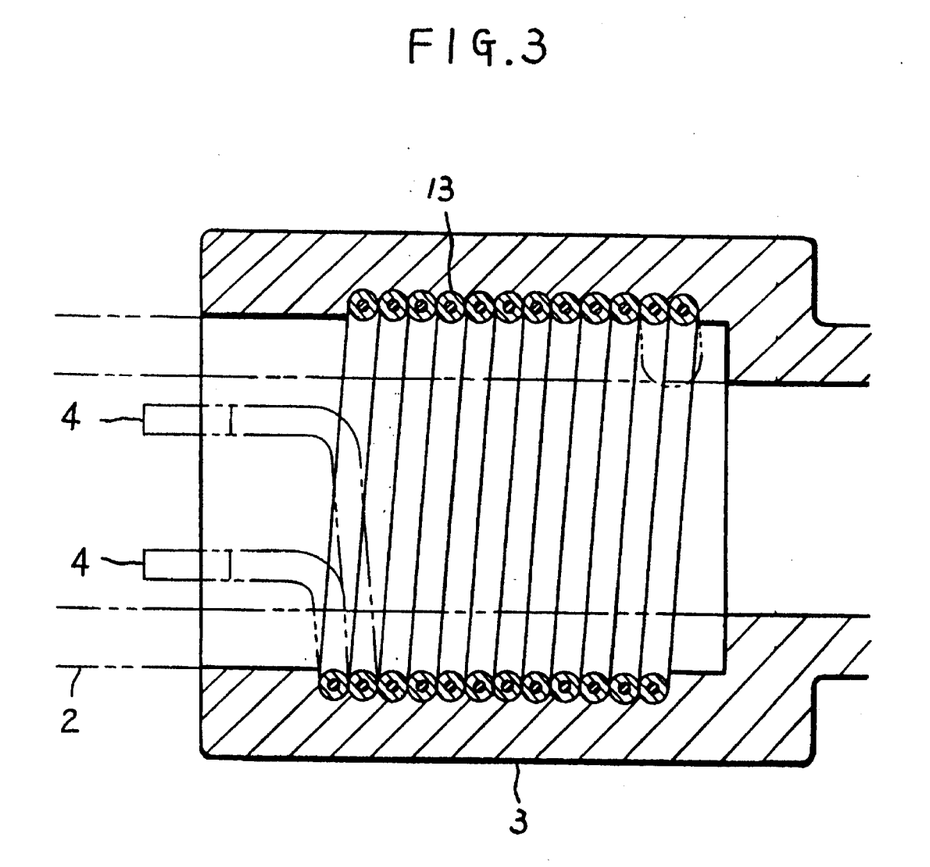
FIG. 3 is a cross section of a socket portion of the EF joint.

The pipes 2 to be joined are inserted in the respective sockets 3. Each of the sockets 3 of the EF joint 1 has an inner periphery in which an independent electric resistance heating wire 13 is embedded. Each resistance heating wire 13 is composed of a core covered with a coating of the same thermoplastic material as the material of the EF joint 1, as shown in FIG. 3. The electric resistance heating wire 13 is folded to form a U-shaped end with a pair of parallel legs extending from the socket. The wire 13 is bent down and coiled around and embedded in the inner periphery of the socket 3 and the free ends of the parallel legs are secured to terminal pins 4.

The two connectors 6 of the EF controller 5 mate with the respective terminal pins 4.

In operation, the plug 8 of the EF controller 5 is plugged in the power supply socket and the ends of the pipes 2 are inserted in the sockets 3 of the EF joint 1. After the connectors 6 are connected to the terminal pins 4 jutting from the sockets 3, the start switch 10 is turned on to initiate the automatic control of the fusion process for the EF joint 1.

When the start button 10 is turned on, a start signal is given to the CPU to initiate the control process shown in FIG. 1. In detail, a power of a certain initial intensity is thus supplied to the electric resistance heating wire 13 to raise its temperature from an ambient temperature T1. The CPU continues to detect the voltage and current (viz. amperes) and count the time.

The first step of the automatic control method is as follows: At a point when the electric power has reached a predetermined level, the variation coefficient of resistance is calculated as an electrical characteristic. Then, ON-OFF control of the electric resistance heating wire is continued at regular intervals for a given time, and the specific heat of the relevant resin is determined by PID (proportional-integral-differential) calculations. The resistance coefficient, depending on temperature of the electric resistance heating wire, as well as the specific heat of the resin is estimated roughly at this stage. ON-OFF of the electric resistance heating wire is cycled three times in the illustrated example of FIG. 1, whereby the temperature of the wire is repeatedly raised and lowered between T2 and T3 (more exactly, between a temperature a little higher than T2 and another temperature a little lower than T3, due to a delay in the system). It can be seen in FIG. 1 that the ON-OFF operation is started when the wire 13 has risen to the temperature T2 which below the resin melting point. (The reference symbols P1, $\Delta$11, and $\Delta$T1–$\Delta$T5 denote a peak of electric power, a difference between the peak and a bottom, and period of time between each peak and the following bottom).

The second step of the automatic control method is as follows: Here, the electric power supplied to the heating electric wire is raised stepwise at successive stages, based on the specific heat and the variation coefficient of resistance which was measured at the first step. During this step, the variation coefficient of resistance is further calculated at each stage. A variation coefficient of specific heat is also determined at each stage by further conducting ON-OFF operations of the heating wire. The roughly estimated values of the heating wire's resistance coefficient depending on temperature and the resin's specific heat obtained at the first step are thus judged as to whether they are accurate or not. If judged "Inaccurate", those values are corrected at this step. The most appropriate heating condition is thus established for the resin at this step. In the illustrated example in FIG. 1, the electric power is raised four times up to higher and higher levels, with one ON-OFF operation being done at each stage. In detail, the temperature of the heating wire 13 is raised from T2 to T4, then lowered to T5. Then the temperature is raised again beyond T4 to T6 and temporarily lowered to T7. The temperature further ascends therefrom to T8 before descending to T9 and then ascends to T10 and descends to T11 before finally converging to the target temperature T10. The last stage, i.e., the fourth stage in this example, is important to confirm the most proper heating condition. There may be cases wherein only one stage after the first stage is enough to establish the heating condition most appropriate in the fusion process, or five or more stages may be required for this purpose. It is highly preferable to limit the maximum number of repeated stages, for exampled 10 (ten). The power supply is interrupted at the end of the final limit stage, i.e., the tenth stage, and an alarm is activated. The described intermittent increasing of power to the electric resistance heating wire 13 is effective to protect the resin from being heated to such a temperature that will cause heat deterioration of the resin. (The symbols P2–P5, $\Delta$12–$\Delta$14, and $\Delta$T6–$\Delta$T8 denote differences between adjacent peaks of electric power, differences between one peak and the next bottom, and periods of time between the adjacent bottoms).

The third step of the preferred method is as follows: The increasing of the supplied power is stopped when the variation coefficient of specific heat (more exactly a reciprocal thereof throughout this specification) measured at the second step just reaches or becomes smaller than a prescribed value. ON-OFF control cycles continue until the specific heat itself becomes equal to or lower than a prescribed level and then the supply of electric power is stopped. In the illustrated example, the specific heat variation coefficient will become smaller than the prescribed value when the increasing power supply has heated the wire 13 to the optimal temperature T10. Thereafter, the power remains at a constant level and the ON-OFF cycles are continued to keep the temperature of the heating wire 13 at the optimal T10. During this leveling-off operation, the differential electric power observed in one cycle of ON-OFF operation gradually decreases as the resin temperature approaches the wire temperature. This means that the specific heat of the resin heated by the wire 13 gradually decreases towards 0 (zero), indicating the melting of resin. The necessary surface portion of the resin article will be molten in this manner, and the power supply will be shut off to finish the fusion process.

The third step may be modified such that the supply of electric power is turned off when a length of time has passed after the start of ON-OFF control cycles in the third step, wherein the length of time is calculated using the value of specific heat measured at the second step.

Figure 4:
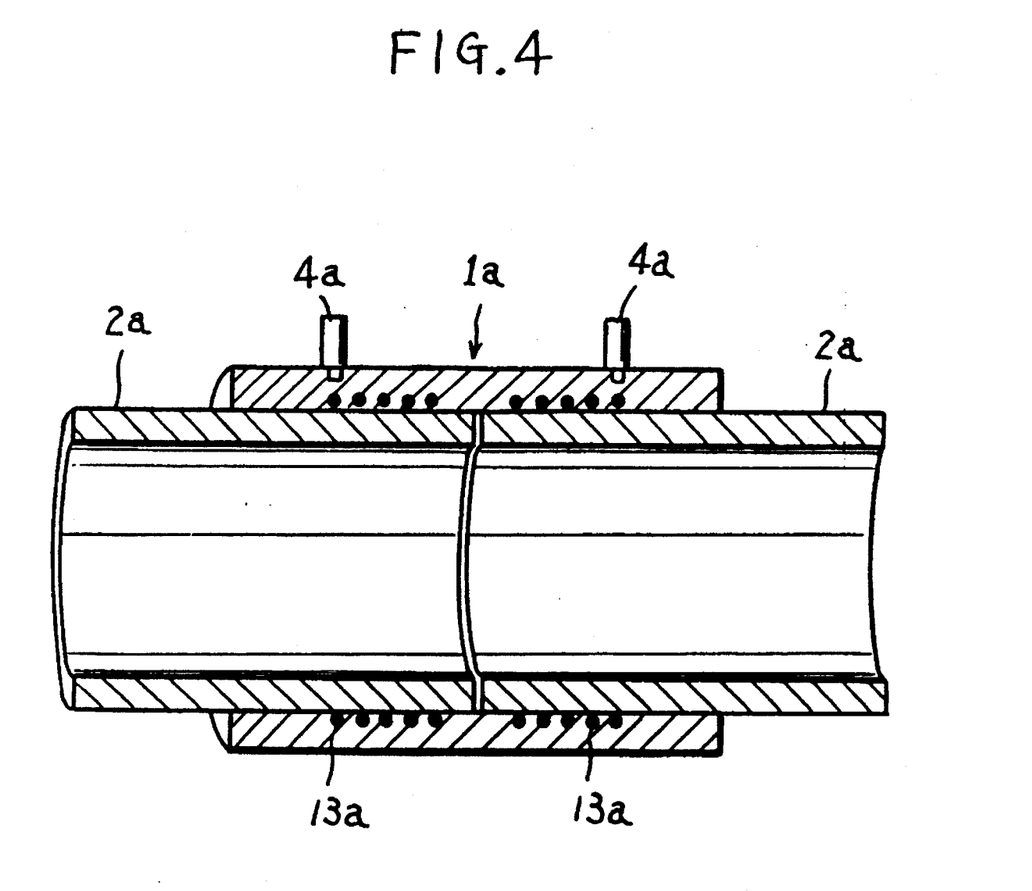
FIG. 4 is a cross section of another EF joint.

FIG. 4 is a cross section of an alternate EF joint 1a to which the method may be employed. This joint 1a is socket-shaped in its entirety, having opposite ends for receiving the ends of pipes 2a to be joined together. The electric resistance heating wire 13a, in this case, is controlled so that both pipe ends are simultaneously molten to become integral with this joint. The electric wire 13a is a bare wire helically configured and embedded in the joint 1a. The wire density is courser in an intermediate region and becomes denser in the end regions approaching the interface between the two pipes. Attached to ends of the wire 13a are terminal pins 4a protruding sideways and outwards of the joint 1a. The connectors 6 of the EF controller 5 mate with the terminal pins 4a and electric power is supplied in the same manner as in the case described above.

Figure 5:
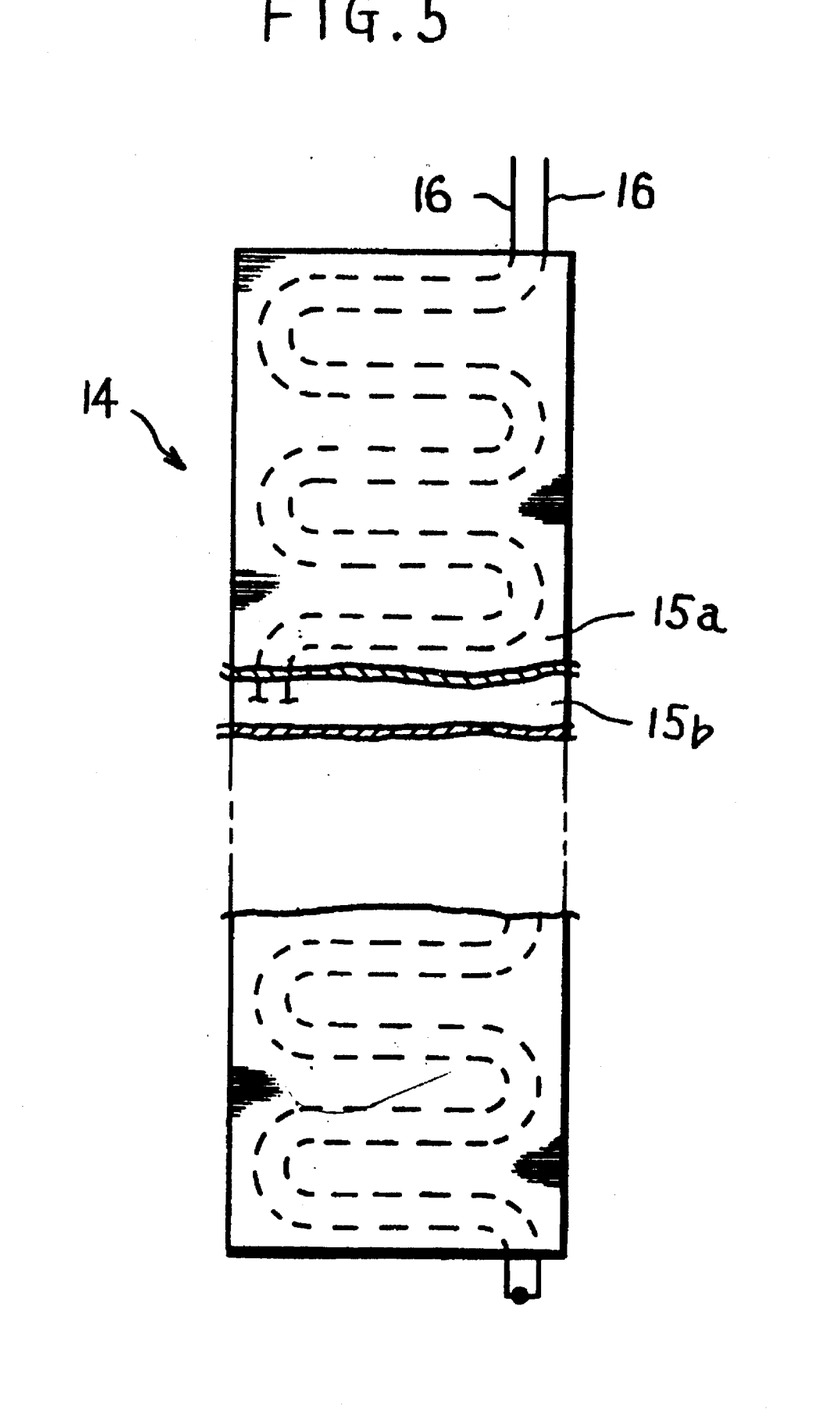
FIG. 5 is a front elevation of a fusible tape.

FIG. 5 shows a fusible tape 14 made of a thermoplastic resin. This tape is composed front and back base layers 15a and 15b, and two heating electric resistance wires 16 sandwiched therebetween. The wires 16 meander transversely of the tape and extend over the full length thereof. In use, an appropriate length of tape is severed from an endless tape supply and two ends of the wires 16 protruding out of one extremity of the severed length are electrically connected one to the other. This severed length of tape is then adhered or otherwise secured to a portion of a thermoplastic article or to portions thereof to be fused together. The other two ends of the wires 16 at the other extremity of the severed length of tape are then mated to the connectors 6 of EP controller 5 which will subsequently be energized to carry out the fusion process. This tape 14 is useful in fusing any thermoplastic articles that have no heating wires embedded therein and may be used on any surface shape of said articles. One particular use is to provide a large-sized consolidated and impermeable sheet to cover an underground garbage pit. Thermoplastic resin unit sheets of a given width are fused together along their parallel sides by means of several lengths this tape 14. Such a large sheet will be effective to prevent various hazardous materials from migrating into the earth. Even if the fusible tape 14 varies significantly along its length due to the variety in shape and dimension of the unit sheets, the automatic control method provided herein will operate successfully and accurately.

Figure 6:
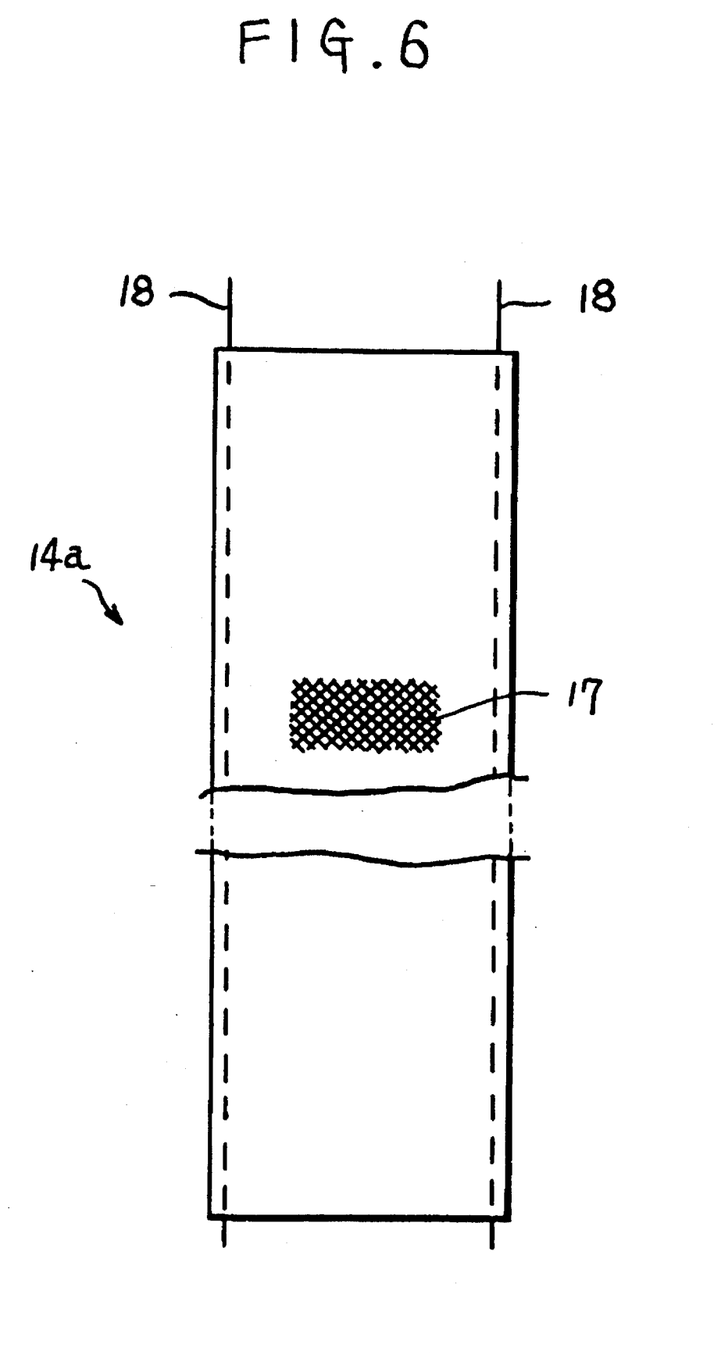
FIG. 6 is a front elevation of another fusible tape.

FIG. 6 shows another fusible tape 14a. This tape comprises a knit fabric of carbon fiber as the base layer 17. A pair of electric wires 18 serving as a cathode and an anode are adhered or otherwise fixed to the longitudinal sides of the base layer. The wires 18 at one end of the tape are connected to connectors 6 of the EF controller 5 to heat the base layer 7. This tape 14a may also be used in the same manner as the first described tape 14, with the base layer being molten.

In summary, the present invention provides an automatic control method for a fusion process wherein an optimal operating condition will be established for the electric resistance wire to heat and partially melt the resin articles, based on the wire's electrical characteristics and the resin's physical properties which are being measured at the same time during the fusion process. Thus, articles made of any resin and included in any type structure can be fused together successfully and accurately.

The various resistance values of heating resistors embedded in EF joints are no longer needed in the method proposed herein. Thus, EF joints can be produced more inexpensively, and the EF controllers can be of a simplified structure as to their connectors.

Further, a drawback wherein a variable gap between the prior art EF joint and the pipe caused a poor fusion is eliminated because the specific heat of the resin is measured during the fusion process so that any gap or clearance will never adversely affect the process in an unpredicted manner.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What is claimed is:

1. A method of automatically controlling the fusion process of thermoplastic articles, including the steps of:

(1) supplying a resistor with an electric current in response to a start signal indicating the start of fusion process, the resistor serving as a heater to fuse together thermoplastic resin surface layers facing one another and in close contact with each other, calculating the electrical characteristics of the resistor upon increase of the electric power to a predetermined level, and also calculating specific heat of the resin by conducting ON-OFF control of the resistor;

(2) subsequently raising the electric power stepwise at successive stages and based on the values of electrical characteristics and specific heat which are already measured at the first step (1), so as to detect a variation coefficient of electrical characteristics at each stage, and also detecting a variation coefficient of specific heat at each stage by further conducting ON-OFF control of the resistor; and (3) finally discontinuing to increase the electric power when the variation coefficient of specific heat measured at the second step (2) will have reached or become smaller than a prescribed value, with the ON-OFF control being continued until the specific heat itself becomes equal to or lower than a prescribed level so that the supply of electric power is ceased.

2. A method of automatically controlling the fusion process of thermoplastic articles, including the steps of:

(1) supplying a resistor with an electric current in response to a start signal indicating the start of fusion process, the resistor serving as a heater to fuse together thermoplastic resin surface layers facing one another and in close contact with each other, calculating the electrical characteristics of the resistor upon increase of the electric power to a predetermined level, and also calculating specific heat of the resin by conducting ON-OFF control of the resistor;

(2) subsequently raising the electric power step wise at successive stages and based on the values of electrical characteristics and specific heat which are already measured at the first step (1), so as to detect a variation coefficient of electrical characteristics at each stage, and also detecting a variation coefficient of specific heat at each stage by further conducting ON-OFF control of the resistor; and (3) finally discontinuing to increase the electric power when the variation coefficient of specific heat measured at the second step (2) will have reached or become smaller than a prescribed value, with the ON-OFF control being continued until a length of time will have passed after the start of ON-OFF control at this step (3) so that the supply of electric power is ceased, wherein the length of time is calculated using the value of specific heat measured at the second step (2).

3. A method of automatically controlling the fusion process of thermoplastic articles, including the steps of:

starting said fusion process by initiating a start signal;

supplying an electric current in response to said start signal to a resistance heating element for fusing together thermoplastic resin surfaces;

increasing electrical power to a predetermined level; calculating the electrical characteristics of said resistance heating element based on said increase of electric power to said predetermined level;

calculating the specific heat of the thermoplastic resin of said thermoplastic resin surfaces by conducting at least one ON-OFF cycle of said resistance heating element;

raising said electric power stepwise in successive stages based on said calculated values of said electrical characteristics and said specific heat;

detecting the variation coefficient of said electrical characteristics at each of said successive stages;

detecting the variation coefficient of said specific heat at each of said successive stages by conducting ON-OFF cycles of said resistance heating element;

discontinuing raising said electric power stepwise in successive stages when said variation coefficient of specific heat is equal to or less than a prescribed value;

continuing said ON-OFF cycles of said resistance heating element with said electric power maintained at the level reached during the last stepwise raise of said electric power; and discontinuing said electric current and said ON-OFF cycles when said thermoplastic resin surfaces reach a state where fusion occurs.

4. A method of automatically controlling the fusion process of thermoplastic articles as defined by claim 3, wherein said state where fusion occurs is determined by sensing when said specific heat becomes equal to or lower than a prescribed level.

5. A method of automatically controlling the fusion process of thermoplastic articles as defined by claim 3, wherein said state where fusion occurs is determined by a method including the steps of:

calculating a fusion-occurrence time based on the specific heat measurement obtained during said step wherein said variation coefficient of specific heat was determined to be equal to or less than a prescribed value; and assuming fusion occurrence at the end of said fusion-occurrence time as measured from the start of the first ON-OFF cycle of said continuing ON-OFF cycles of said resistance heating element with said electric power maintained at the level reached during the last stepwise raise of said electric power.

* * * * *